United States Patent
Bosco

(10) Patent No.: US 9,200,661 B2
(45) Date of Patent: Dec. 1, 2015

(54) FLOW DRILL SCREW

(71) Applicant: GM GLOBAL TECHNOLOGY OPERATIONS LLC, Detroit, MI (US)

(72) Inventor: Anthony A. Bosco, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 56 days.

(21) Appl. No.: 14/133,794

(22) Filed: Dec. 19, 2013

(65) Prior Publication Data

US 2015/0176624 A1 Jun. 25, 2015

(51) Int. Cl.
- *F16B 35/00* (2006.01)
- *F16B 25/10* (2006.01)
- *F16B 25/00* (2006.01)

(52) U.S. Cl.
CPC ........... *F16B 25/106* (2013.01); *F16B 25/0057* (2013.01); *F16B 25/0078* (2013.01)

(58) Field of Classification Search
CPC ...... F16B 23/00; F16B 23/0007; F16B 25/00; F16B 35/041; F16B 35/044; F16B 25/0057; F16B 25/0078; F16B 25/106; B21K 1/52
USPC ................. 411/387.8, 388, 403, 411, 424
See application file for complete search history.

(56) References Cited

U.S. PATENT DOCUMENTS

| | | | | | |
|---|---|---|---|---|---|
| 2,024,071 | A | * | 12/1935 | Taylor et al. | 411/424 |
| 2,087,881 | A | * | 7/1937 | Bastable | 411/403 |
| 2,743,565 | A | * | 5/1956 | Dow | 56/11.2 |
| 3,072,423 | A | * | 1/1963 | Charlton | 403/83 |
| 3,555,957 | A | * | 1/1971 | Hermle | 411/440 |
| 3,897,713 | A | * | 8/1975 | Gugle | 411/389 |
| 4,106,619 | A | * | 8/1978 | Haytayan | 206/346 |
| 4,647,883 | A | * | 3/1987 | Oxley | 333/245 |
| 5,154,610 | A | * | 10/1992 | Gregorio Gracia | 433/74 |
| 6,491,487 | B1 | * | 12/2002 | Wojciechowski | 411/181 |
| 6,887,023 | B1 | * | 5/2005 | Lu et al. | 411/387.1 |
| 7,905,698 | B2 | * | 3/2011 | Liu et al. | 411/458 |
| 2012/0272486 | A1 | * | 11/2012 | Murphy et al. | 24/16 R |

* cited by examiner

*Primary Examiner* — Roberta Delisle
(74) *Attorney, Agent, or Firm* — Quinn Law Group, PLLC

(57) ABSTRACT

A flow drill screw can retain a structure and includes a shank extending along a longitudinal axis. The shank includes a first shank end and a second shank end opposite the first shank end. The flow drill screw further includes a pointed tip coupled to the first shank end. The pointed tip includes at least one facet. The flow drill screw also includes a stud extending from the shank along the longitudinal axis and away from the first shank end. The stud includes a first stud end and a second stud end opposite the first stud end. Further, the stud includes external threads between the first and second stud ends. The flow drill screw includes an annular flange coupled to the second shank end and the first stud end. Moreover, the flow drill screw includes a head coupled to the second stud end.

15 Claims, 7 Drawing Sheets

FLOW DRILL SCREW

TECHNICAL FIELD

The present disclosure relates to a flow drill screw.

BACKGROUND

Flow drill screws are used to couple components together. As used herein, the term "flow drill screw" refers to a screw that is pressed against a target material, which has not been pre-drilled, with sufficient rotational speed and pressure to generate friction heat in the target material. The friction heat softens the target material, allowing the flow drill screw to form a hole through the target material. Unlike conventional drilling, no target material is lost while the flow drill screw forms the hole; rather, the target material is flowed by the flow drill screw and therefore forms a sleeve around the hole.

SUMMARY

It is useful to develop a flow drill screw capable of being attached to a structure once the flow drill screw has already been inserted into a target material. In an embodiment includes a shank extending along a longitudinal axis. The shank includes a first shank end and a second shank end opposite the first shank end. The flow drill screw further includes a pointed tip coupled to the first shank end. The pointed tip includes at least one facet. The flow drill screw also includes a stud extending from the shank along the longitudinal axis and away from the first shank end. The stud includes a first stud end and a second stud end opposite the first stud end. Further, the stud includes external threads between the first and second stud ends. The flow drill screw includes an annular flange coupled to the second shank end and the first stud end. Moreover, the flow drill screw includes a head coupled to the second stud end.

The present disclosure also relates to a coupling assembly. In an embodiment, the coupling assembly includes a first structure, a second structure, and a flow drill screw. The flow drill screw includes a shank. The shank defines a first shank end and a second shank end opposite the first shank end. The shank extends through the first structure. The flow drill screw further includes a stud extending from the shank along the longitudinal axis in a direction away from the first shank end. The stud is entirely disposed outside the first structure. The stud includes a coupling structure coupled to the second structure.

The present disclosure also relates to a vehicle. The vehicle includes a first structure and a second structure. The second structure defines a hole. The vehicle further includes a flow drill screw. The flow drill screw includes a shank defining a first shank end and a second shank end opposite the first shank end. The shank extends through the first structure. The flow drill screw further includes a stud extending from the shank in a direction away from the first shank end. The stud is at least partially disposed outside the first structure. Further, the stud is at least partially disposed through the opening. Moreover, the stud includes a coupling structure configured to engage the second structure in order to couple the first structure to the second structure.

The above features and advantages and other features and advantages of the present invention are readily apparent from the following detailed description of the best modes for carrying out the invention when taken in connection with the accompanying drawings.

DETAILED DESCRIPTION

Figure 1:
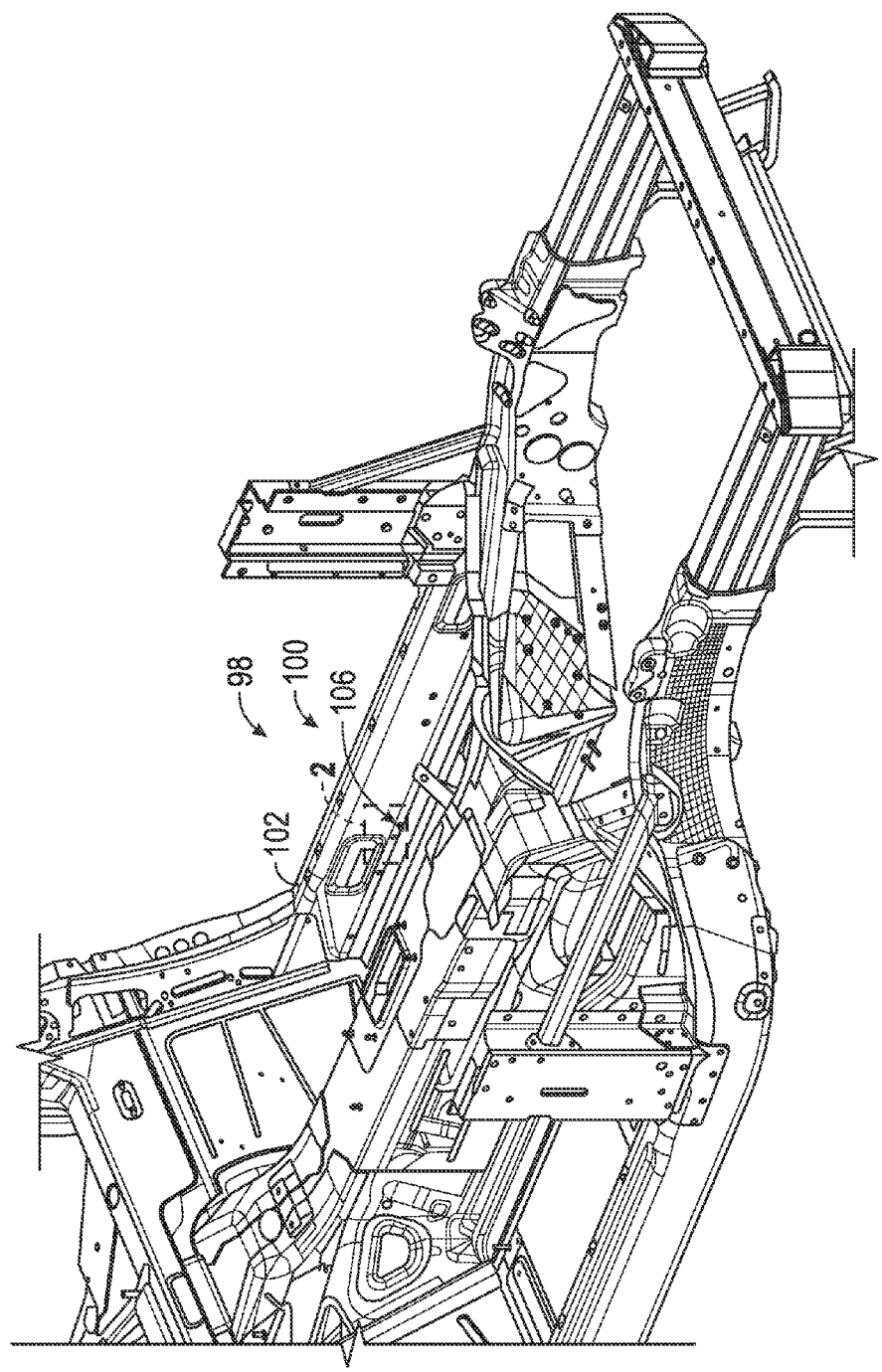
FIG. 1 is a schematic, perspective view of a vehicle frame including at least one flow drill screw.
Figure 2:
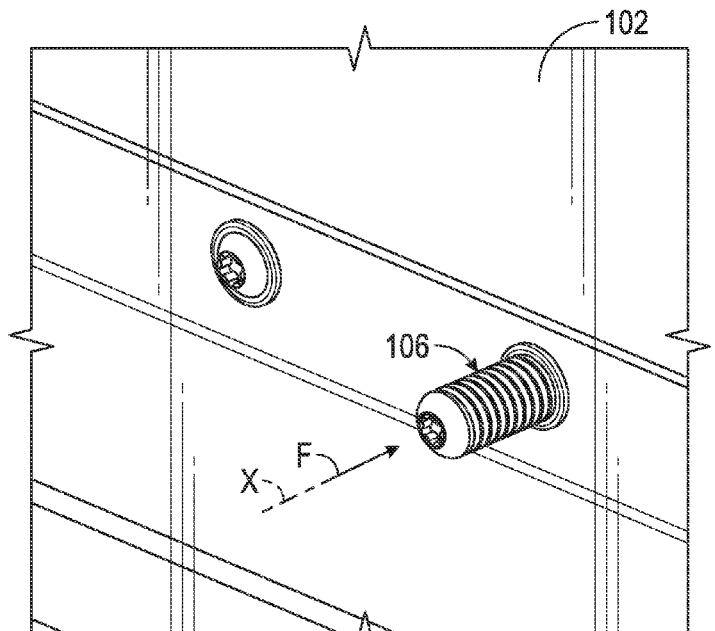
FIG. 2 is a schematic, perspective, enlarged view of the vehicle frame, showing portion 2 from FIG. 1, showing a flow drill screw in accordance with an embodiment of the present disclosure.
Figure 3:
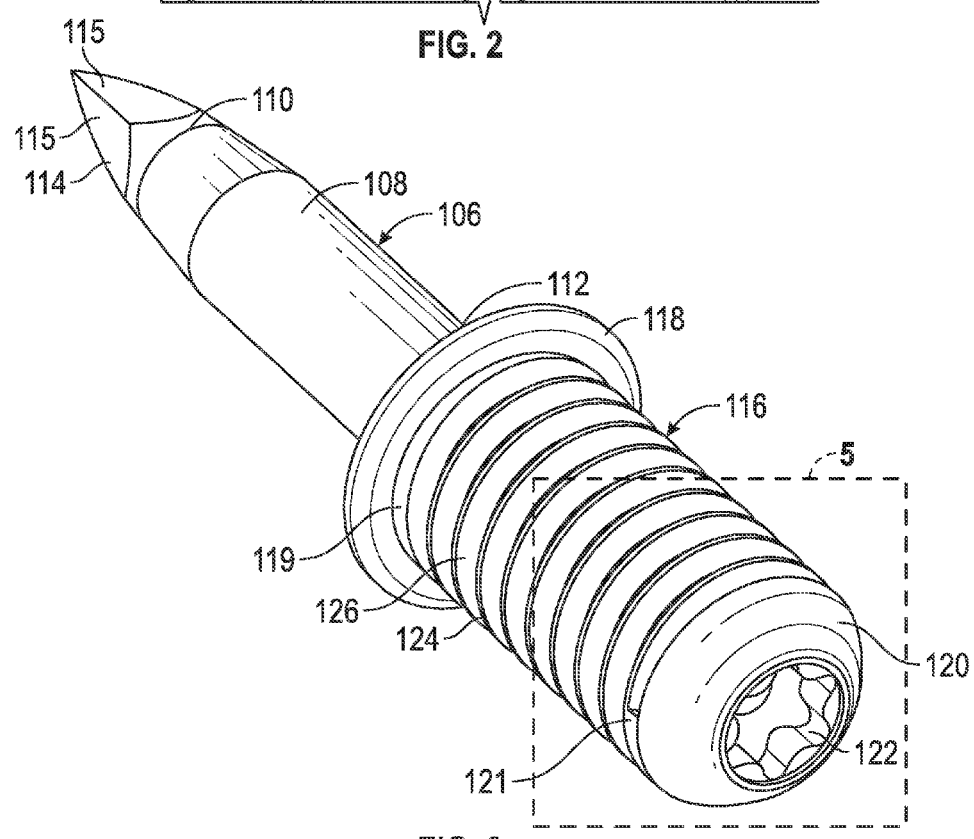
FIG. 3 is a schematic, perspective view of the flow drill screw shown in FIG. 2.
Figure 4:
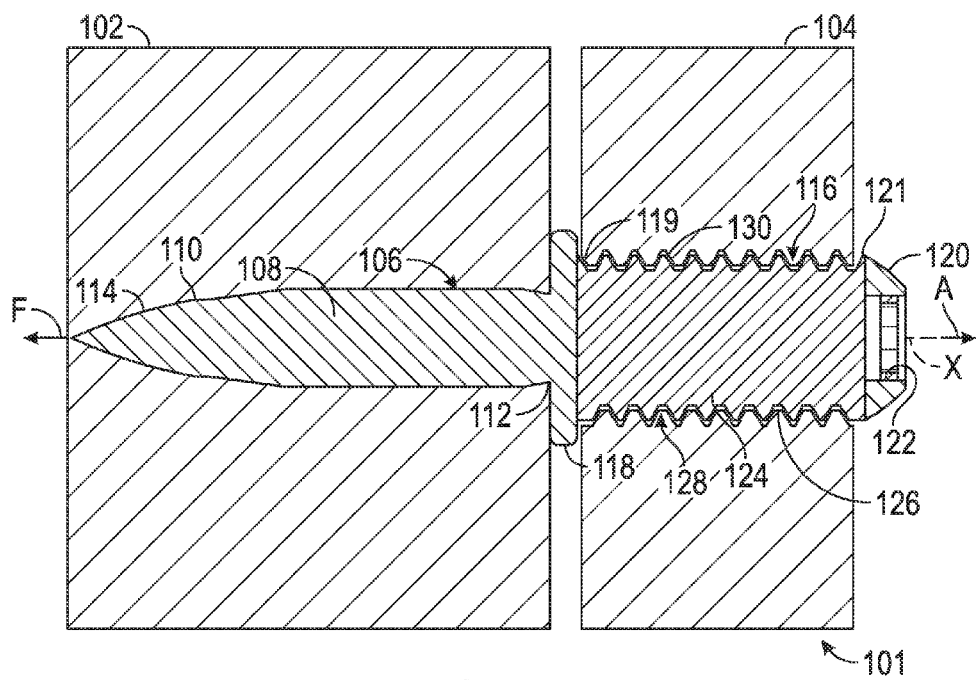
FIG. 4 is a schematic, side sectional view of the flow drill screw shown in FIG. 2 coupled to first and second structures.
Figure 5:
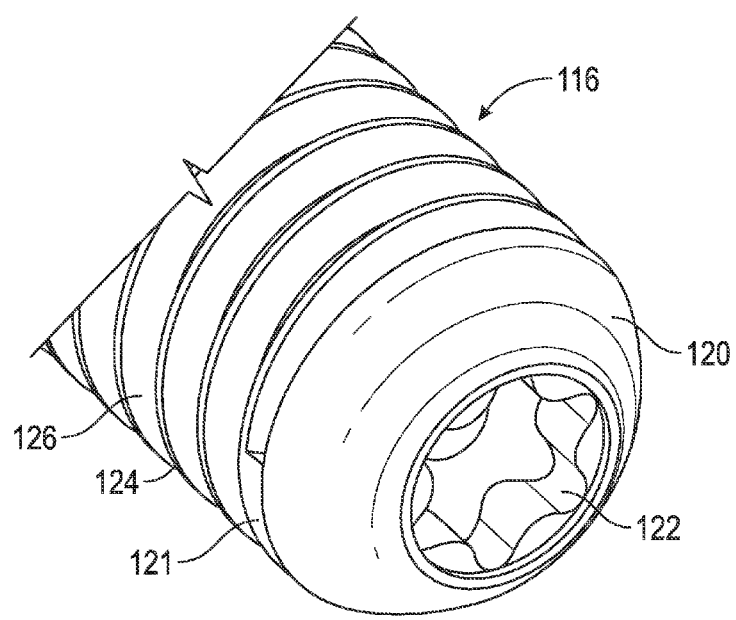
FIG. 5 is a schematic, enlarged, perspective view of a portion of the flow drill screw shown in FIG. 2, showing portion 5 from FIG. 3.

Referring now to the drawings, wherein the like numerals indicate corresponding parts throughout the several views, FIGS. 1 and 2 schematically illustrate part of a vehicle frame 100 including a structure 102 (e.g., chassis). Although the figures illustrate a car frame, the vehicle frame 100 may be a frame of any kind of vehicle such as a car, boat, or airplane. The structure 102 may be referred to as a first structure and can be coupled a second structure 104 (FIG. 4) via at least one flow drill screw 106. The vehicle frame 100 is part of a vehicle 98, such car.

With reference to FIGS. 2-5, the flow drill screw 106 includes an elongated shank 108 having a first shank end 110 and a second shank end 112 opposite the first shank end 110. The elongated shank 108 may extend along a longitudinal axis X and does not necessarily include external threads. For example, in the depicted embodiment, the elongated shank 108 does not include external threads. It is envisioned, however, that the elongated shank 108 may include external threads.

The flow drill screw 106 further includes a pointed tip 114 (e.g., self-tapping tip) for facilitating insertion of the flow drill screw 106 into the first structure 102. The pointed tip 114 is directly coupled to the first shank end 110 and therefore extends from the first shank end 110 of the elongated shank 108 along the longitudinal axis X. The pointed tip 114 may include at least one facet 115. In the depicted embodiment, the pointed tip 114 includes more than one facet 115.

In addition to the pointed tip 114, the flow drill screw 106 includes a stud 116 extending from the second shank end 112 of the elongated shank 108 along the longitudinal axis X. The stud 116 may extend from the elongated shank 108 in a direction A away from the first shank end 110 and the pointed tip 114. The flow drill screw 106 may include an annular flange 118 directly coupled to the second shank end 112 and the first stud end 119. The annular flange 118 separates the elongated shank 108 and stud 116. Further, the annular flange 118 defines an outer perimeter that is larger than the outer perimeter of the stud 116 and the shank 108. The stud 116 also extends along the longitudinal axis X and defines a first stud end 119 and a second stud end 121 opposite the first stud end 119. In addition to the stud 116, the flow drill screw 106 includes a head 120 coupled to the second stud end 121. In the depicted embodiment, the head 120 has a convex shape and defines a socket 122 configured, shaped, and sized to receive a tool (not shown) such as a screwdriver or a flow drilling tool. The tool can be inserted in the socket 122, and then the flow drill screw 106 can be turned about the longitudinal axis X in order to advance the pointed tip 114 and the elongated shank 108 into the first structure 102 (FIG. 1). In the depicted embodiment, the socket 122 is a hexalobular socket; however, any suitable shaped socket can be incorporated into the head 120.

The stud 116 includes a coupling structure 124 (or coupling feature) configured to engage the second structure 104, thereby coupling the first structure 102 to the second structure 104 via the flow drill screw 106. In the depicted embodiment, the coupling structure 124 includes external threads 126 configured to threadedly engage the second structure 104. The external threads 126 may have helical configuration and are disposed between the first stud end 119 and the second stud end 121. For example, the external threads 126 may extend from the first stud end 119 to the second stud end 121. In other words, the external threads 126 may be disposed along the entire length of the stud 116. The second structure 104 may define a hole or opening 128, such as a threaded hole, and include internal threads 130 that define the hole 128. As such, the hole 128 may be referred to as a threaded hole. The internal threads 130 of the second structure 104 can mate with the external threads 126 of the coupling structure 124 in order to couple the second structure 104 to the stud 116 of the flow drill screw 106.

With reference to FIGS. 1-5, the flow drill screw 106 can be used to couple a first structure 102 (e.g. chassis) to a second structure 104 (FIG. 104). To do so, a force is applied to the flow drill screw 106 in the direction indicated by the arrow F (FIGS. 2 and 4) while the flow drill screw 106 is also rotated about the longitudinal axis X in order to insert the pointed tip 114 and the elongated shank 108 into the first structure 102. The flow drill screw 106 is advanced and rotated until the elongated shank 108 is partly or entirely disposed in the first structure 102. For example, the flow drill screw 106 can be advanced and rotated until the annular flange 118 contacts the first structure 102. Regardless, at this point, the stud 116 should be partly or entirely outside the first structure 102. Next, the second structure 104 is coupled to the coupling structure 124 of the stud 116. For example, the stud 116 can be inserted into the hole 128 so that the internal threads 130 mate with the external threads 126 of the stud 116, thereby coupling the flow drill screw 106 to the second structure 104. At this point, the first structure 102 is coupled to the second structure 104 via the flow drill screw 106. The first structure 102, second structure 104, and flow drill screw 106 may be collectively referred to as a coupling assembly 101.

Figure 6:
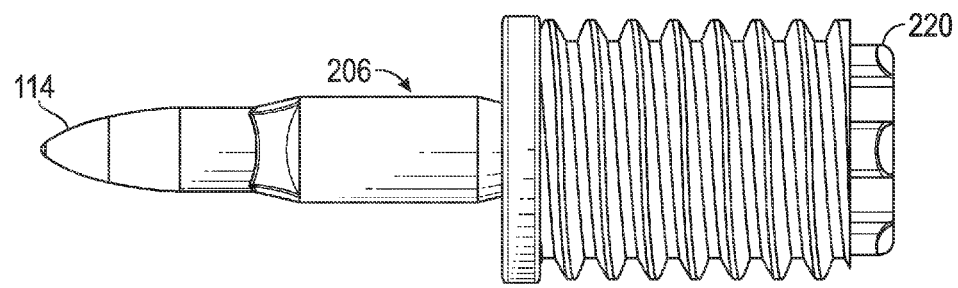
FIG. 6 is a schematic, side view of a flow drill screw in accordance with another embodiment of the present disclosure.
Figure 7:
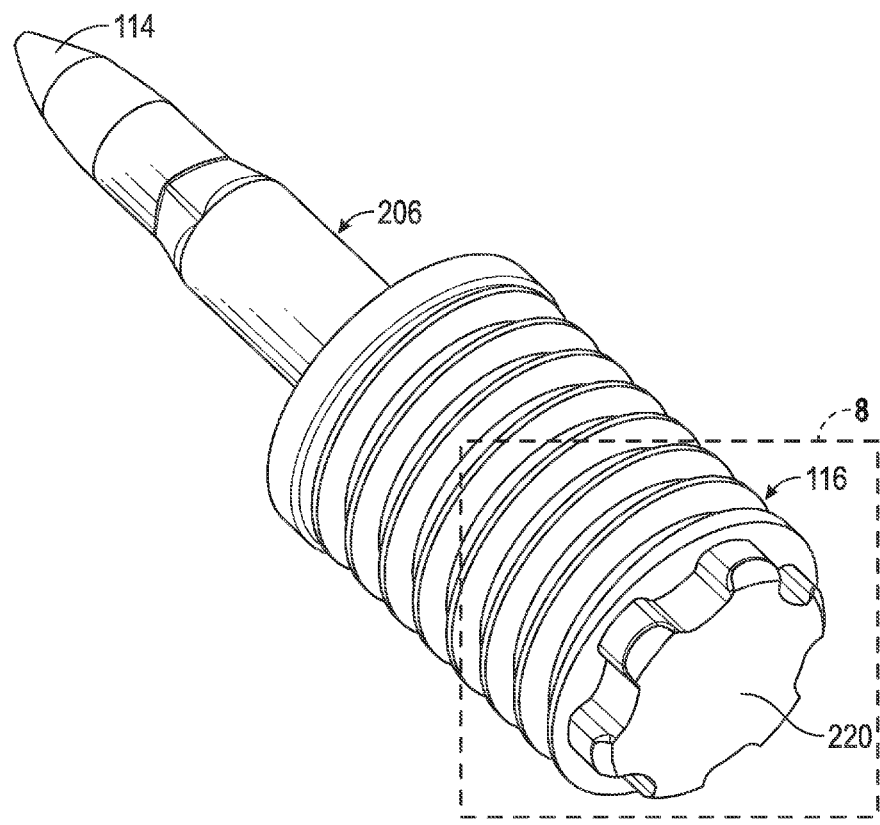
FIG. 7 is a schematic, perspective view of the flow drill screw shown in FIG. 6.
Figure 8:
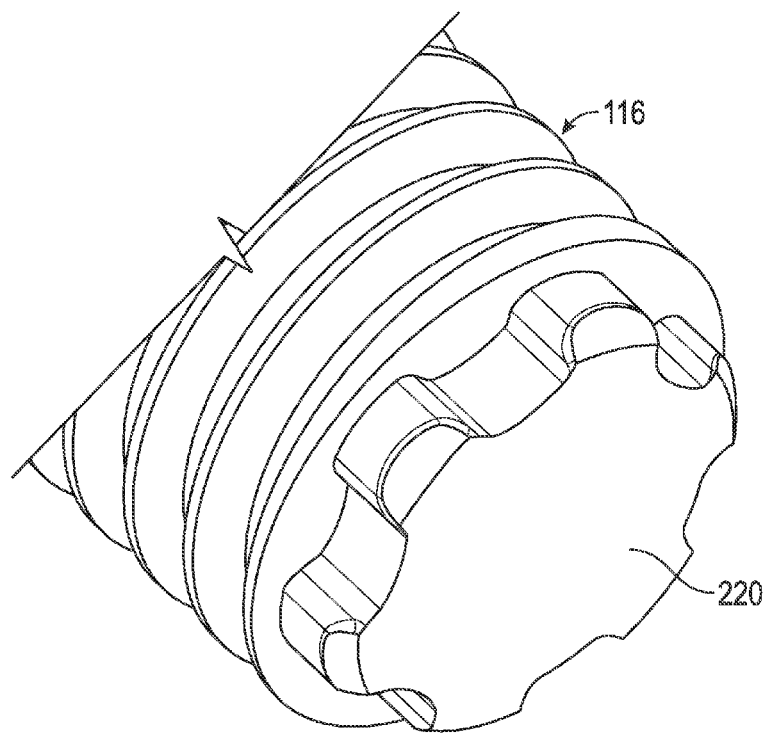
FIG. 8 is a schematic, enlarged perspective view of a portion of the flow drill screw shown in FIG. 6, showing portion 8 from FIG. 7.

FIGS. 6-8 schematically illustrate another embodiment of the flow drill screw 206 that is substantially similar to the flow drill screw 106 described above with respect to FIGS. 3-5, except that the head 220 does not include a socket. Rather, the head 220 of the flow drill screw 206 has a drive profile configured to mate with a socket (not shown). In the depicted embodiment, the head 220 has a hexalobular shape. It is envisioned, however, that the head 220 may have other suitable shapes.

Figure 9:
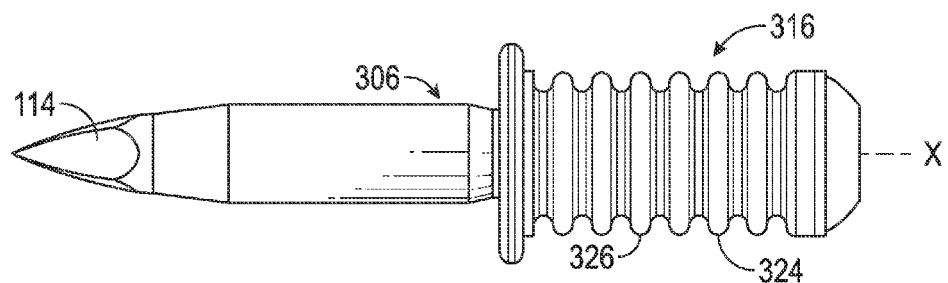
FIG. 9 is a schematic, side view of a flow drill screw in accordance with an embodiment of the present disclosure.
Figure 10:
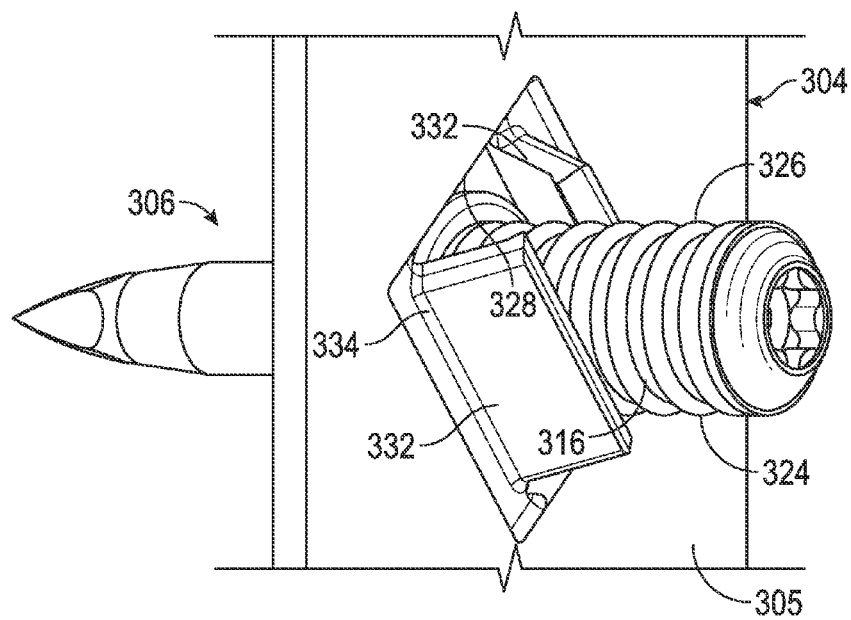
FIG. 10 is a schematic, perspective view of the flow drill screw shown in FIG. 9 coupled to a structure.

FIGS. 9 and 10 schematically illustrate another embodiment of the flow drill screw 306 that is substantially similar to the flow drill screw 106 described above with respect to FIGS. 3-5, except that the coupling structure 324 of the stud 316 includes ribs 326 instead of external threads. The ribs 326 may have substantially annular shapes and are spaced apart from one another along the longitudinal axis X. Further, the ribs 326 are not necessarily helical. Thus, all the ribs 326 may be arranged substantially parallel to one another. Regardless of their arrangement, the ribs 326 can engage a second structure 304 in order to couple the first structure 102 (e.g., chassis) to the second structure 304 via the flow drill screw 306.

With continued reference to FIGS. 9 and 10, the second structure 304 includes a main body 305 and at least one wall 332 movably coupled to the main body 305. In the depicted embodiment, the second structure 304 includes two walls 332 pivotally coupled to the main body 305. Although the drawings show two walls 332, the second structure 304 may include more or fewer walls 332. A living hinge 334 pivotally couples each wall 332 to the main body 305. The second structure 304 defines a hole 328 and the two walls 332 can move relative to the walls 332. The hole 328 is configured, shaped, and sized to receive at least a portion of the stud 316. The walls 332 can be biased towards a closed position such as to substantially close the hole 328. However, the stud 316 can be inserted through the hole 328 to couple the flow drill screw 306 to the second structure 304. As the stud 316 moves through the hole 328, the walls 332 move (e.g., pivot) away from the hole 328, thereby allowing the stud 316 to extend through the hole 328. At this point, the walls 332 contact (or otherwise engage) at least one rib 326 in order to couple the stud 316 to the second structure 304.

Figure 11:
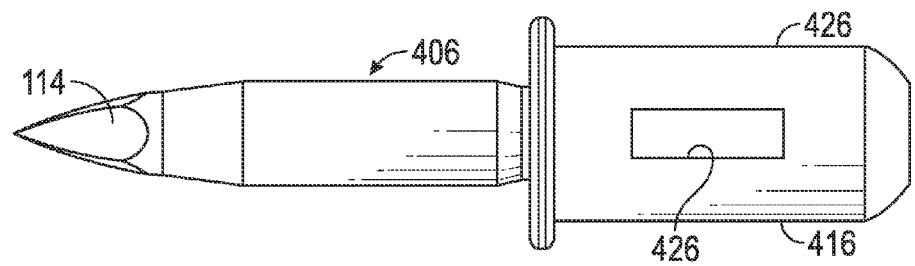
FIG. 11 is a schematic, side view of a flow drill screw in accordance with another embodiment of the present disclosure.
Figure 12:
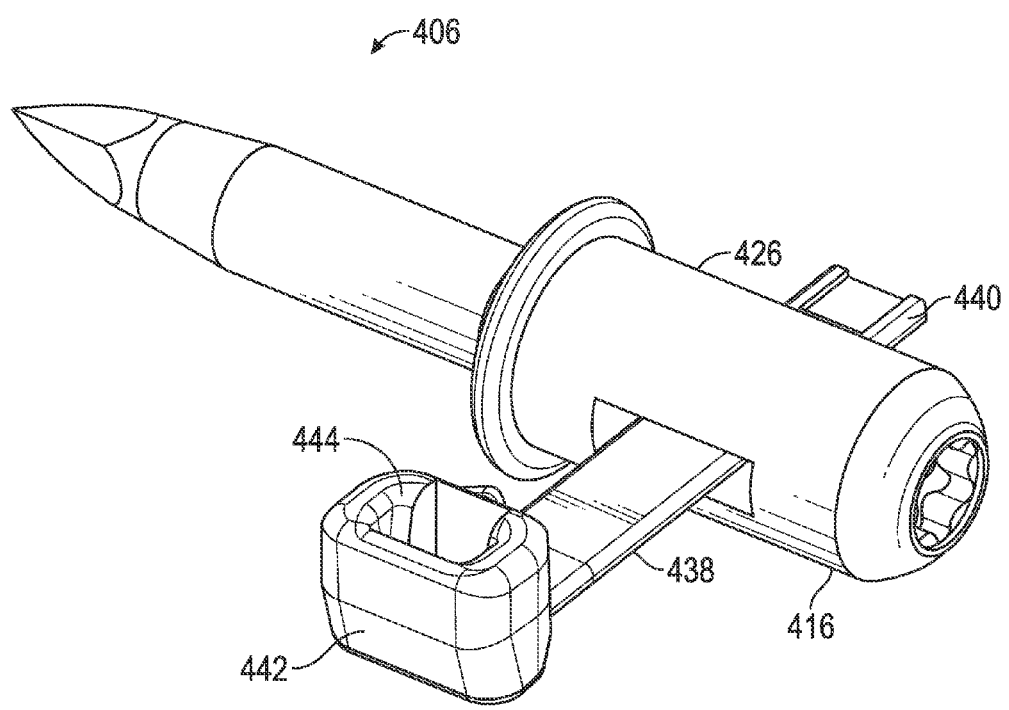
FIG. 12 is a schematic, perspective view of the flow drill screw shown in FIG. 11 coupled to a tie strap.

FIGS. 11 and 12 schematically illustrate another embodiment of the flow drill screw 406 that is substantially similar to the flow drill screw 106 described above with respect to FIGS. 3-5, except that the coupling structure 324 of the stud 316 includes a slot 426 instead of external threads. The slot 426 extends through the stud 316 and is configured, shaped, and sized to receive at least a portion of a tie strap. The tie strap 438 can be used to attach the stud 416 to another object. In the depicted embodiment, the tie strap 438 includes a flexible strip 440 and a lock housing 442. The lock housing 442 defines a lock opening 444 configured, shaped, and sized to receive a portion of the flexible strip 440 to tie down the tie strap 438.

While the best modes for carrying out the invention have been described in detail, those familiar with the art to which this invention relates will recognize various alternative designs and embodiments for practicing the invention within the scope of the appended claims.

The invention claimed is:
1. A flow drill screw for retaining a structure, comprising:
    a shank extending along a longitudinal axis, wherein the shank includes a first shank end and a second shank end opposite the first shank end;
    a pointed tip coupled to the first shank end, the pointed tip including at least one facet;
    a stud extending from the shank along the longitudinal axis and away from the first shank end, the stud including a first stud end and a second stud end opposite the first stud end, the stud including a plurality of ribs between the first and second stud ends;

an annular flange coupled to the second shank end and the first stud end; and a head coupled to the second stud end.

2. The flow drill screw of claim 1, wherein the ribs extend along an entire length of the stud.

3. The flow drill screw of claim 2, wherein the shank is characterized by the absence of threads.

4. The flow drill screw of claim 1, wherein the head defines a socket.

5. The flow drill screw of claim 1, wherein each of the ribs has an annular shape.

6. A coupling assembly, comprising:
a first structure;
a second structure;
a flow drill screw including:
   a shank including a first shank end and a second shank end opposite the first shank end, wherein the shank extends through the first structure;
   a stud extending from the shank in a direction away from the first shank end, wherein the stud is at least partly disposed outside the first structure, the second structure defines an opening, and the stud at least partially extends through the opening; and
wherein the stud includes a coupling structure coupled to the second structure, the coupling structure includes a plurality of ribs, each of the ribs has an annular shape and is disposed around the stud, the second structure includes a main body and at least one wall pivotally coupled to the main body, the at least one wall is movable relative to the opening, and the at least one wall engages at least one of the ribs.

7. The coupling assembly of claim 6, wherein the coupling structure includes external threads disposed around the stud.

8. The coupling assembly of claim 6, wherein the coupling structure includes a slot extending through the stud.

9. The coupling assembly of claim 8, wherein the second structure is a tie strap partially disposed through the slot.

10. The coupling assembly of claim 6, wherein the first structure is a chassis.

11. A vehicle, comprising:
a first structure;
a second structure defining a hole;
a flow drill screw including:
   a shank defining a first shank end and a second shank end opposite the first shank end, wherein the shank extends through the first structure;
   a stud extending from the second shank end of the shank in a direction away from the first shank end, the stud being disposed outside the first structure, the stud being at least partially disposed through the hole; and
wherein the stud includes a coupling structure configured to engage the second structure, and the coupling structure includes a slot extending through the stud, and the second structure includes a tie strap partially disposed through the slot.

12. The vehicle of claim 11, wherein the coupling structure includes a plurality of external helical threads disposed around the stud.

13. The vehicle of claim 11, wherein the coupling structure includes a plurality of annular ribs disposed around the stud.

14. The vehicle of claim 13, wherein each of the ribs has an annular shape and is disposed around the stud.

15. The vehicle of claim 14, wherein the second structure defines an opening, and the stud at least partially extends through the opening.

\* \* \* \* \*